US012036477B2

(12) United States Patent
Linden et al.

(10) Patent No.: US 12,036,477 B2
(45) Date of Patent: *Jul. 16, 2024

(54) SYSTEMS AND METHODS TO ENABLE ADMINISTRATORS TO INCENTIVIZE IN-GAME USER BEHAVIORS AND IN-GAME USER ACTIVITIES VIA GROUP AGREEMENTS THAT GOVERN USER GROUPS WITHIN AN ONLINE GAME

(71) Applicant: Mythical, Inc., Sherman Oaks, CA (US)

(72) Inventors: John Linden, Sherman Oaks, CA (US); Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,824

(22) Filed: Sep. 24, 2021

(65) Prior Publication Data

US 2022/0266149 A1 Aug. 25, 2022

Related U.S. Application Data

(63) Continuation of application No. 17/185,740, filed on Feb. 25, 2021, now Pat. No. 11,179,638.

(51) Int. Cl.
*A63F 13/00* (2014.01)
*A63F 13/69* (2014.01)
(Continued)

(52) U.S. Cl.
CPC .............. *A63F 13/73* (2014.09); *A63F 13/69* (2014.09); *A63F 13/79* (2014.09); *A63F 2300/575* (2013.01)

(58) Field of Classification Search
CPC ... A63F 13/12; G07F 17/3225; G07F 17/3276
See application file for complete search history.

(56) References Cited

U.S. PATENT DOCUMENTS 8,469,801 B2   6/2013   Ocko
9,452,356 B1   9/2016   Tsao
(Continued)

FOREIGN PATENT DOCUMENTS

WO         2020247002        12/2020

OTHER PUBLICATIONS

Rockstarflipper, "Ebay for Beginners, Episode #5. Top Rated Seller & Feedback"—(https://www.youtube.com/watch?v=6tk9sZ95ZW8), Mar. 19, 2017 (Year: 2017).

(Continued)

*Primary Examiner* — David L Lewis
*Assistant Examiner* — Eric M Thomas
(74) *Attorney, Agent, or Firm* — Esplin & Associates, PC

(57) ABSTRACT

Systems and methods to enable administrators to incentivize one or both of particular in-game user behaviors and particular in-game user activities via group agreements that govern user groups within an online game are disclosed. Exemplary implementations may: effectuate presentation of an administrative agreement interface that enables administrators to: define a formation proposal of a new group agreement to be formed, formation incentives thereof, and prospective users for the new group agreements, and define an activity proposal of proposed activities for a user group and activity incentives thereof; receive an indication of acceptance to form the new group agreement, generate instructions to form the new group agreement as a smart contract and transmit such to a decentralized ledger server for recordation; provide the formation incentives to the prospective users subsequent to the generation; receive (Continued)

indication of execution of the activities and responsively provide the activity incentives to the user group.

20 Claims, 6 Drawing Sheets

(51) Int. Cl.
*A63F 13/73* (2014.01)
*A63F 13/79* (2014.01)

(56) References Cited

U.S. PATENT DOCUMENTS

| | | | |
|---|---|---|---|
| 9,665,239 B1 | 5/2017 | Koh | |
| 9,895,613 B1 | 2/2018 | Holtz | |
| 10,512,843 B1 | 12/2019 | Cunningham | |
| 10,518,178 B1 | 12/2019 | Cunningham | |
| 10,765,948 B2 | 9/2020 | Eatedali | |
| 10,835,828 B1 | 11/2020 | Pather | |
| 10,850,202 B1 | 12/2020 | Koch | |
| 10,861,095 B1 | 12/2020 | Koch | |
| 10,946,283 B1 | 3/2021 | Meilich | |
| 10,946,291 B1 | 3/2021 | Harris | |
| 10,984,400 B1 | 4/2021 | Koch | |
| 11,044,098 B1 | 6/2021 | Thacker | |
| 11,045,729 B2 | 6/2021 | Yoshida | |
| 11,135,516 B1 | 10/2021 | Koch | |
| 11,138,580 B1 | 10/2021 | Koch | |
| 11,141,664 B1 | 10/2021 | Koch | |
| 11,148,058 B1 | 10/2021 | Koch | |
| 11,173,401 B1 | 11/2021 | Linden | |
| 11,173,402 B1 | 11/2021 | Koch | |
| 11,173,404 B1 | 11/2021 | Koch | |
| 11,179,638 B1 | 11/2021 | Linden | |
| 11,179,640 B1 | 11/2021 | Koch | |
| 11,192,033 B1 | 12/2021 | Koch | |
| 11,192,036 B1 | 12/2021 | Koch | |
| 11,224,818 B2 | 1/2022 | Cunningham | |
| 11,229,848 B1 | 1/2022 | Koch | |
| 11,238,477 B1 | 2/2022 | Koch | |
| 11,288,759 B1 | 3/2022 | Linden | |
| 11,325,046 B1 | 5/2022 | Koch | |
| 11,328,358 B2 | 5/2022 | Koch | |
| 11,383,171 B1 | 7/2022 | Stoyanov | |
| 11,439,903 B2 | 9/2022 | Hayashi | |
| 11,511,201 B1 | 11/2022 | Thacker | |
| 11,833,435 B2 | 12/2023 | Thacker | |
| 2005/0137015 A1 | 6/2005 | Rogers | |
| 2006/0100006 A1 | 5/2006 | Mitchell | |
| 2006/0190392 A1 | 8/2006 | Samid | |
| 2007/0087831 A1 | 4/2007 | Van Luchene | |
| 2007/0099685 A1 | 5/2007 | Van Luchene | |
| 2007/0202951 A1 | 8/2007 | Bogosian | |
| 2009/0113040 A1* | 4/2009 | Zalewski | G06Q 10/00 709/224 |
| 2009/0113554 A1* | 4/2009 | Zalewski | H04L 63/10 726/26 |
| 2009/0318221 A1 | 12/2009 | Dhunjishaw | |
| 2009/0325690 A1 | 12/2009 | Zhou | |
| 2010/0205430 A1 | 8/2010 | Chiou | |
| 2011/0183749 A1 | 7/2011 | Allen | |
| 2011/0312424 A1 | 12/2011 | Burckart | |
| 2013/0172086 A1 | 7/2013 | Ikenaga | |
| 2014/0011595 A1 | 1/2014 | Muller | |
| 2014/0058806 A1* | 2/2014 | Guenette | G05B 15/02 705/14.1 |
| 2014/0162781 A1 | 6/2014 | Butler | |
| 2015/0170112 A1 | 6/2015 | Decastro | |
| 2015/0224409 A1 | 8/2015 | Hayashida | |
| 2015/0371295 A1 | 12/2015 | Gill | |
| 2015/0375103 A1 | 12/2015 | George | |
| 2016/0005270 A1 | 1/2016 | Marr | |
| 2016/0292680 A1 | 10/2016 | Wilson, Jr. | |
| 2016/0330034 A1 | 11/2016 | Back | |
| 2017/0095741 A1 | 4/2017 | Perry | |
| 2017/0236360 A1 | 8/2017 | Dewaal | |
| 2018/0178125 A1 | 6/2018 | Perry | |
| 2019/0028265 A1 | 1/2019 | Bisti | |
| 2019/0158484 A1 | 5/2019 | Grunewald | |
| 2019/0282906 A1 | 9/2019 | Yong | |
| 2019/0299105 A1 | 10/2019 | Knight | |
| 2019/0354945 A1 | 11/2019 | Mahajan | |
| 2020/0090143 A1 | 3/2020 | Iervolino | |
| 2020/0160320 A1 | 5/2020 | Williams | |
| 2020/0202668 A1 | 6/2020 | Cotta | |
| 2020/0206620 A1 | 7/2020 | Hayashi | |
| 2020/0294133 A1 | 9/2020 | Cella | |
| 2020/0311721 A1 | 10/2020 | Ow | |
| 2020/0320623 A1 | 10/2020 | McGrath | |
| 2021/0052981 A1 | 2/2021 | Yi | |
| 2021/0106920 A1 | 4/2021 | Lim | |
| 2022/0072437 A1 | 3/2022 | Koch | |
| 2022/0266151 A1 | 8/2022 | Koch | |
| 2022/0280874 A1 | 9/2022 | Koch | |
| 2022/0314125 A1 | 10/2022 | Koch | |
| 2023/0302366 A1 | 9/2023 | Koch | |

OTHER PUBLICATIONS

Wood, Mike, "How to Leave Feedback on Ebay",—(https://www.youtube.com/watch?v=EIY1uTuAixA), May 25, 2017 (Year: 2017).
Wood, Mike, "How to Leave Feedback on Ebay"—(https://www.youtube.com/watch?v=EIYiuTuAixA),May 25, 2017 (Year: 2017).

* cited by examiner

Formation Proposal — 350

New Group Agreement:

Specify Distribution Gains Committed:     302

- All ⌄
  - 50%
  - Other amount

Pick/Prioritize Trigger Event(s):

☐ Date/time __    ☒ Amount reached $500    ☐ Other

☐ Particular transaction __    ☐ Amount of transactions __

Dispersion (of group account balance) – pick one:

☒ Equally divided    ☐ Individually Based on    ☐ Other

Prospective Participants:

- Select Behavior Pattern(s) for Prospective Partic.. ⌄ and/or Enter Users:

1. User 10    3. User 25
2. User 17    4. User 6

Formation Incentives:

☐ Match Distribution Gains    ☐ Bonus Dispersion:
                                                ☐ Virtual Item    ☐ Virtual Currency ☒ Contribute to Group    ☐ Other
   Account Balance $100

304

[ Send Proposals    306 ]

*Fig. 3A*

SYSTEMS AND METHODS TO ENABLE ADMINISTRATORS TO INCENTIVIZE IN-GAME USER BEHAVIORS AND IN-GAME USER ACTIVITIES VIA GROUP AGREEMENTS THAT GOVERN USER GROUPS WITHIN AN ONLINE GAME

CROSS-REFERENCE TO RELATED APPLICATIONS

The present application is related to U.S. patent application Ser. No. 17/150,242, entitled "SYSTEMS AND METHODS TO PROVIDE SHARING OF BENEFITS AMONGST A GROUP OF USERS BASED ON GAINS FROM DISTRIBUTION RIGHTS PERTAINING TO DIGITAL ASSETS", which was filed on Jan. 15, 2021, the contents of which are incorporated herein by reference in their entirety.

FIELD OF THE DISCLOSURE

The present disclosure relates to systems and methods to enable administrators to incentivize one or both of particular in-game user behaviors and particular in-game user activities via group agreements that govern user groups within an online game.

BACKGROUND

Online gaming platforms are known. Users of online gaming platforms exchanging digital in-game assets to other users is known. Distributed ledgers are known techniques to produce a secure record or registry of ownership of assets, transactions, and other information. For example, a distributed blockchain is a distributed ledger.

SUMMARY

One aspect of the present disclosure relates to a system configured to enable administrators to incentivize one or both of particular in-game user behaviors and particular in-game user activities via group agreements that govern user groups within an online game. The system may include one or more hardware processors configured by machine-readable instructions, administrative agreement interfaces, online gaming platforms, decentralized ledger servers, and/or other components. Machine-readable instructions may include one or more instruction components. The instruction components may include one or more of administrative interface component, presentation effectuation component, instruction initiation component, activity execution component, instructions component, user behavior monitoring component, and/or other instruction components.

The administrative interface component may be configured to effectuate presentation of an administrative agreement interface that enables administrators to: define new group agreements to be formed, define formation incentives responsive to formation of the new group agreements, specify users that are prospective participants for the new group agreements as defined, and initiate transmission of formation proposals to client computing platforms associated with the users that may be prospective participants. The formation proposals may correspond to the new group agreements and the formation incentives as defined.

The administrative agreement interface may further enable the administrators to specify proposed activities for the user groups, specify activity incentives for the proposed activities, and initiate transmission of activity proposals to individual client computing platforms associated with the users of the user groups. Some of the proposed activities may cause changes in behavior patterns of the users that are part of the user groups. The activity proposals may correspond to the proposed activities and the activity incentives specified. By way of non-limiting illustration, a given formation proposal may propose formation of a given group agreement between a given set of users that are prospective participants for the given group agreement and a given formation incentive. A given activity proposal may propose a given set of activities to users of a given user group and a given activity incentive.

The presentation effectuation component may be configured to effectuate presentation of the formation proposals and the activity proposals. Presentation of the formation proposals and the activity proposals may be effectuated via the online gaming platform. By way of non-limiting illustration, the given formation proposal may be presented to the given set of the users and the given activity proposal may be presented to the users of the given user group.

The instruction initiation component may be configured to receive indications of acceptance to form the new group agreements. The indications of acceptance may be received from client computing platforms associated with the users that are prospective participants. By way of non-limiting illustration, a given indication of acceptance may be received from a client computing platform associated with a user from the given set of users to form the given group agreement in accordance with the given formation proposal.

The instruction initiation component may be configured to generate, responsive to receipt of the indications of acceptance, sets of instructions to form the new group agreements as smart contracts. By way of non-limiting illustration, a given set of instructions may be generated to form the given group agreement as a given smart contract. The instruction initiation component may be configured to transfer the given set of instructions to a decentralized ledger server.

The instruction initiation component may be configured to provide the given formation incentive to the given set of the users in accordance with the given formation proposal. The given formation incentive may be provided subsequent to generation of the given set of instructions.

The activity execution component may be configured to receive, from the online gaming platform, information indicating execution of the activities. By way of non-limiting illustration, particular information may be received that indicates execution of the given set of the activities by the users of the given user group.

The activity execution component may be configured to provide, responsive to the receipt of the particular information, the given activity incentive to the users of the given user group in accordance with the given activity proposal.

The decentralized ledger server may be configured by machine-readable instructions that include the instructions component. The instructions component may be configured to receive and execute the sets of instructions to record the new group agreements on the blockchain as the smart contracts. By way of non-limiting illustration, the given set of instructions may be received and executed to record the given smart contract on the blockchain.

As used herein, any association (or relation, or reflection, or indication, or correspondency) involving servers, processors, client computing platforms, assets, requests, exchanges, offers, transactions, in-game actions, rights, benefits, ownership, users, metrics, metric values, scores, gains, trigger events, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIGS. 3A-3B-3C illustrate example implementations of an agreement interface as may be used by a system configured to enable administrators as described herein, in accordance with one or more implementations.

DETAILED DESCRIPTION

Figure 1:
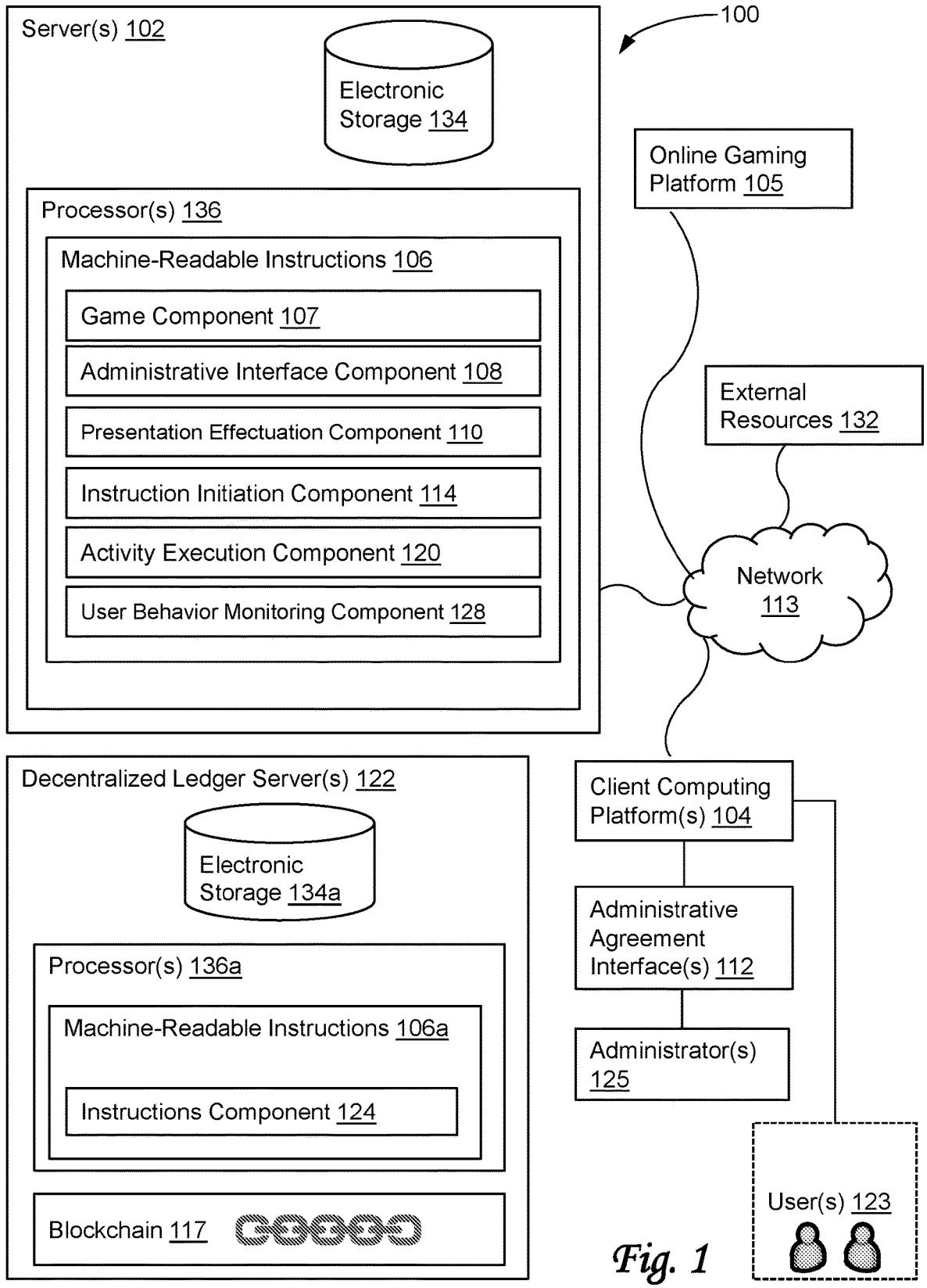
FIG. 1 illustrates a system configured to enable administrators to incentivize one or both of particular in-game user behaviors and particular in-game user activities via group agreements that govern user groups within an online game, in accordance with one or more implementations.

FIG. 1 illustrates a system 100 configured to enable administrators to incentivize one or both of particular in-game user behaviors and particular in-game user activities via group agreements that govern user groups within an online game, in accordance with one or more implementations. System 100 may include one or more servers 102, administrative agreement interfaces 112, decentralized ledger server(s) 122, one or more client computing platform(s) 104, online gaming platforms 105, one or more external resources 132, and/or other components. Users 123 (also referred to as players) may include one or more of a first user, a second user, a third user, a fourth user, and/or other users. As used in descriptions herein, any use of the term "user" may refer to user(s) 123. Electronic storage 134a may be similar to electronic storage 134 as described elsewhere in this disclosure, though included in decentralized ledger servers 122.

Instances of online games may be executed within one or more online gaming platforms 105. As used herein, online gaming platform 105 may refer to either an individual game (e.g., an interactive online game), a type of gaming console and its ecosystem, and/or both. Online gaming platform 105 may be configured to host the one or more (online) games. Online gaming platform 105 may be operated, hosted, and/or owned by one or more stakeholders of online gaming platform 105. For example, a platform operator (and/or another stakeholder) may sell in-game digital assets (e.g., characters, weapons, resources, etc.) to users 123 of online gaming platform 105. However, such a sale is not a player-to-player exchange/transaction. As used herein, exchanges or transactions may refer to player-to-player actions that facilitate individual players to auction, sell, purchase, trade, barter, and/or otherwise exchange digital assets. In other words, individual players may own individual virtual items, and exchange these items with other individual players. Due to an exchange, ownership rights of a digital asset transitions from an original owner to a new owner (even if there may, in some implementations, be one or more intermediary and/or temporary owners during the process of performing the exchange). Due to an exchange, a holder of distribution rights of a digital asset may remain and the holder of the distribution rights may receive distribution gains.

The distribution rights of digital assets may reflect rights held by the individual ones of the users to receive certain distributions of benefits upon exchanges involving particular digital assets. That is, the individual users may own/hold rights to particular digital assets that guarantee them benefits upon (future) exchanges involving those digital assets regardless of whether the individual users owns/hold the ownership rights for those digital assets. In some implementations, the distribution gains may result from a particular action or activity (such as, e.g., a sale of a particular digital asset), e.g., within online gaming platform 105, of a particular digital asset. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the users that hold the distribution rights) receive something of value and/or use.

The administrators may include one or more of a stakeholder, an owner, a platform operator, and/or other administrators. The group agreements may (i) commit the distribution gains to group account balances associated with the user groups, and (ii) disperse at least a portion of the group account balances to the users within the respective user groups.

The distribution gains may include proceeds from transactions pertaining to digital assets that the users of the user groups hold the distribution rights to. The distribution gains may include one or more virtual currencies such as virtual tokens, virtual stars, virtual points, virtual real-world currencies (e.g., US Dollars (USD)), and/or other gains that are based on the particular digital assets. The group account balances may refer to a cumulation of the one or more virtual currencies that include the distribution gains associated with the digital assets and thus associated with the users participating in the corresponding group agreements. In some implementations, the group account balances may accumulate multiple of the virtual currencies. The one or more virtual currencies may be converted to another one of the virtual currencies. For example, a given group account balance may accumulate USD and virtual points, and the virtual points may be converted to USD to be included in the given group account balance.

In some implementations, the digital assets may include and/or be virtual items that are not fungible and may be usable within an online gaming platform 105. In some implementations, the digital assets may represent three-dimensional in-game user-controllable characters that can interact with other virtual items within online gaming platform 105. By way of non-limiting example, digital assets may represent virtual items. In some implementations, virtual items may include one or more of weapons, toys, characters, abilities, skills, tools, pets, clothing, vehicles, game levels, missions, assignments, chapters, tasks, minigames, restricted areas within a virtual space, restricted modes of gameplay, access rights within an online game, and/or other virtual items. In some implementations, virtual items may refer to any item or object within gaming platform 105 that a user may use, own, sell, trade, destroy, and/or otherwise effectuate a change of ownership of.

As used herein, a digital asset is fungible if it is functionally and/or physically indistinguishable from another digital asset. For example, a payment token such as a Bitcoin may be a fungible digital asset. A digital asset may be non-fungible if it is unique, or one-of-a-kind. For example, a specific individual Crypto Kitty™ may be a non-fungible digital asset. A digital asset may be semi-fungible if there is a set of a limited number of similar but distinguishable digital assets. For example, a limited-edition Blanko™ or another in-game character may be a semi-fungible digital asset. For example, one of a limited number of 2-dimensional or 3-dimensional in-game virtual items may be a semi-fungible digital asset. For example, a digital ticket to a show, concert, exhibition, and/or other event may be a semi-fungible digital asset. For example, a piece of art or jewelry (e.g., as a virtual item or as representing a physical item) may be a semi-fungible digital asset. As used herein, both non-fungible and semi-fungible digital assets are considered as "not fungible" digital assets. In some implementations, digital assets may be usable within one or more games.

The group agreements may disperse at least a portion of the group account balances to the users within the respective user groups. In some implementations, dispersion of at least the portion of the group account balances may be determined individually for the individual users of the user groups (i.e., participating in the group agreements). In some implementations, determining the dispersion (that is, the portion of a particular group account balance) for the individual users may be based on the distribution gains committed to the particular group account balance by the individual participating users, time spent on online gaming platform 105 by the individual participating users, progress within the game by (or attributable to) the individual participating users, damage done to another digital asset by using the digital asset, victory within the game by the individual participating users, contribution to a goal of the individual participating users, and/or information.

In some implementations, determining the dispersion of at least the portion of the group account balances to the users of the user groups may include dividing the group account balances evenly between the users of the respective user groups. In some implementations, the dispersion of at least the portion of the group account balances to the users of the user groups may include dividing the group account balances proportionally (based on distribution gains of the users committed by the group agreement) between the users.

The group agreements may specify and/or select trigger events that may cause the dispersion of the group account balances to the users within the respective user groups. The trigger events may determine a time that the user groups are dispersed the portion of the group account balances. By way of non-limiting example, the trigger events may include recorded transactions, particular ones of the recorded transactions, a particular amount of the transactions, a particular amount of a given transaction (e.g., 10 exchanges of digital assets), the group account balance reaching a predefined amount, a reoccurring a predefined time (e.g., every $15^{th}$ day of a month), and/or other trigger events.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, system 100 and/or decentralized ledger server(s) 122 may be configured to communicate with one or more of online gaming platform(s) 105, users 123, and/or other components. Users 123 may include players who play and/or otherwise interact on online gaming platform 105.

Decentralized ledger server(s) 122 may include one or more of electronic storage 134a, processor(s) 136a, machine-readable instructions 106a, blockchain 117, and/or other components. Machine-readable instructions 106a may include one or more instruction components. The instruction components may include computer program components. The instruction components may include one or more of an instructions component 124 and/or other instruction components.

In some implementations, blockchain 117 may be maintained by a distributed computing platform (not shown in FIG. 1). In some implementations, the distributed computing platform may be implemented by a set of client computing platforms and/or servers (including, for example, one or more decentralized ledger servers 122). The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain 117. The smart contracts may be stored on blockchain 117. In some implementations, the distributed computing platform may be the EOSIO platform. In some implementations, the distributed computing platform may be Ethereum. In some implementations, the distributed computing platform may be similar to Ethereum. In some implementations, the virtual machine may be a decentralized virtual machine.

Server(s) 102 may include electronic storage 134, processor(s) 136, machine-readable instructions 106, and/or other components. Processor(s) 136a may be similar to processor(s) 136 as described elsewhere in this disclosure, though included in decentralized ledger servers 122. Machine-readable instructions 106a may be similar to machine-readable instructions 106 as described elsewhere in this disclosure, though included in decentralized ledger servers 122. Server(s) 102 may be configured by machine-readable instructions 106. Machine-readable instructions 106 may include one or more instruction components. The instruction components may include computer program components. The instruction components may include one or more of a game component 107, administrative interface component 108, presentation effectuation component 110, instruction initiation component 114, activity execution component 120, instructions component 124, user behavior monitoring component 128, and/or other instruction components.

In some implementations, game component 107 may be configured to execute, via online gaming platform 105, an instance of a game. The instance of the game may facilitate presentation of the game to users 123. For example, the instance of the game may be an online game executed with online gaming platform 105. Game component 107 may be configured to implement in-game actions in the instance of the game in response to action requests for the in-game actions by the users. In some implementations, game component 107 may be arranged, organized, and/or otherwise included in online gaming platform 105. As used herein, the term "game" may refer to one or more games within gaming platform 105. In some implementations, the game may be provided via a virtual space, and may include a plurality of resource types and/or maps.

The presentation of the game may be based on the views of the game that are determined during execution of the game. In some implementations, the view may be communicated (e.g., by streaming, via object/position data, and/or other information) from decentralized ledger server(s) 122 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the game may include a simulated space that is accessible by users 123 by clients (e.g., client computing platforms 104) that present the views of the virtual space to a user. The simulated space may have a topography, express ongoing real-time interaction by one or more users 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). User-controlled elements controlled by and/or associated with a given user may be created and/or customized by the given user. Individual users 123 may have an "inventory" of virtual goods and currency (e.g., resources of the plurality of resource types) that the individual user can use (e.g., by manipulation of a user character and/or other user-controlled elements) and/or other items, to perform in-game actions within the virtual space. By way of non-limiting illustration, users 123 may include the first user and the second user that interact with online gaming platform 105. The first user and the second user may control digital assets (e.g., characters) in a game hosted by online gaming platform 105. In some implementations, user inventories may be managed using blockchain 117. For example, ownership of individual virtual items included in an individual user inventory may be recorded on blockchain 117. In some implementations, individual user inventories may correspond to individual smart contracts stored on blockchain 117.

Administrative interface component 108 may be configured to effectuate presentation of administrative agreement interfaces 112 that enables administrators to define formation proposals and activity proposals. Administrative agreement interface 112 may be presented within or outside online gaming platforms 105. Administrative agreement interface 112 may include one or more user interface elements. The user interface elements may be configured to facilitate user interaction with administrative agreement interface 112, user entry, and/or selections to define the formation proposals and the activity proposals. By way of non-limiting example, the user interface elements may include one or more of text input fields, drop down menus, check boxes, display windows, virtual buttons, and/or other user interface elements.

The formation proposals may include new group agreements to be formed, a formation incentive to be provided upon formation of the new group agreements, users that are prospective participants of the new group agreements, and/or other information. The formation proposals may be suggestions of new group agreements that particular users are recommended to agree to/form. The particular users may be recommended to agree to/join the new group agreements by transmitting the formation to the particular users. Responsive to the formation of the group agreements, the formation incentives may be provided to the users that agreed to the new group agreements. Thus, users may be incentivized to agree to/join group agreements within online gaming platforms 105.

The activity proposals may include proposed activities for users of the user groups governed by the group agreements already established. The activity proposals may further include activity incentives to be provided upon execution of the proposed activities. The activity proposals may be suggestions of particular activities that the users of the user groups (that are governed by the group agreements) are to execute and in return for execution, receive the activity incentives. Thus, the users that are already included in the user groups that are governed by the group agreements are incentivized to execute the proposed activities and/or change their behavior patterns within online gaming platforms 105.

Administrative agreement interfaces 112 may enable the administrators to define the new group agreements. Defining the new group agreements of the formation proposals may include defining the distribution gains committed to group account balances associated with the new group agreements, a time for the dispersion of at least a portion of the group account balances to the users within the respective user groups, individual portions of the group account balances that are dispersed to the users, and/or other features of the new group agreements.

Administrative agreement interfaces 112 may enable the administrators to define the formation incentives that are responsive to formation of the new group agreements. The formation incentives may include one or more of contributions to the group account balances, matching the distribution gains that are committed to the group account balances, dispersing a direct bonus to the users within the respective user groups, and/or other formation incentives. The contributions to the group account balances may be in the form of a virtual currency. A contribution to match the distribution gains may be in the same form of the virtual currency of the distribution gains committed. In some implementations, the contribution to match the distribution gains may be in a different form of the virtual currency of the distribution gains committed. The direct bonus may be dispersed directly to the users. The direct bonus may include one or more of the virtual items (e.g., 50 tons of wood), the virtual currency, both, and/or other bonuses.

Administrative agreement interfaces 112 may enable the administrators to specify and/or select users that are prospective participants for the new group agreements defined. Prospective participants may refer to users that are likely to or suitable to join/agree to the new group agreements defined. In some implementations, the administrators may specify and/or select the users that are prospective participants by entering names of the users, usernames, avatar names, and/or other names associated with the users. In some implementations, specifying and/or selecting the users for the new group agreements may be limited to a particular amount of users (e.g., maximum of 20 users).

Administrative agreement interfaces 112 may enable the administrators to initiate transmission of formation proposals to client computing platforms 104 associated with the users that are the prospective participants. The formation proposals may correspond to the new group agreements and the formation incentives defined. The transmissions of the formation proposals may be initiated by selection of a particular one of the user interface elements (e.g., a virtual button) that executions transmission of the formation proposals. The formation proposals may be transmitted to respectively client computing platforms 104 via network 113.

By way of non-limiting illustration, a given formation proposal may propose formation of a given group agreement between a given set of users. The given set of users may be prospective participants for the given group agreement. The given formation proposal may further propose a given formation incentive upon formation of the given group agreement.

Administrative agreement interfaces 112 may enable the administrators to specify and/or select proposed activities for the user groups. The user groups may already be governed by respective group agreements. By way of non-limiting example, the proposed activities for the user groups may include one or more of modifying the group agreements, recruiting new users to online gaming platform 105, referring other users to join the user groups, and/or other proposed activities. Modifying the group agreements may include one or more of modifying the trigger events, modifying the distribution gains committed to the group account balances associated with the user groups, modifying the user groups (i.e., the users of the user groups, e.g., removing or adding users), and/or other modifications to the group agreements. In some implementations, participating users may be prompted to agree to modifications of group agreements. For example, in some implementations, a particular user may opt in and/or opt out a modified group agreement.

Some of the proposed activities may cause changes in behavior patterns of the users of the user groups. Behavior patterns may include actions performed by the users within a virtual space of a game. The user behavior patterns may include individual ones of the actions, sets of actions, ordered sets of actions, and/or multiple of the individual actions, the sets of actions, and the ordered set of actions. The actions may include one or more of a purchase, a sale, a trade, a selection of a user interface element, time spent on a particular user interface, amount of time of sessions of the game, times of the sessions of the game (e.g., 9 PM to 12 AM), engagement with virtual content, communication of the users with particular users, completion of tasks by the users or lack thereof, failure of tasks by the users, frequent interaction with the virtual items, formation of alliances by the users, and/or other actions performed by the users.

The changes in the behavior patterns caused by proposed activities may include increasing time spent on online gaming platform 105, playing the game via online gaming platform 105 during a particular time of day (e.g., 8 PM to 10 PM), in-game victories frequency (e.g., winning 60% of games played), changes in the individual actions of the users, the sets of actions, the ordered sets of actions, and/or other changes in the behavior patterns. In some implementations, administrative agreement interfaces 112 may enable the administrators to specify the changes in the behavior patterns so that the user groups may perform the behavior patterns and/or activities (e.g., same as the proposed activities) to achieve the behavior patterns. In some implementations, some of the user interface elements may facilitate the selection and/or entry of one or more of the behavior patterns to change via the proposed activities and/or other ones of the actions by the users.

In some implementations, the proposed activities may be for execution by a particular user of a user group. By way of non-limiting illustration, all activities of a given set of activities may be for execution by a particular user of a given user group. In some implementations, individual ones of the proposed activities may be for execution by an individual particular user. By way of non-limiting illustration, individual ones of the given set of the activities may be for execution by particular users of the given user group. For example, the given user group may include a first user and a second user. The given set of activities may include a first activity and a second activity. The first activity may be for execution by the first user and the second activity may be for execution by the second user.

Administrative agreement interfaces 112 may enable the administrators to specify and/or select activity incentives for the proposed activities. The activity incentives may be the same as or similar to the formation incentives and/or other activity incentives different from the formation incentives. The activity incentives may encourage the users to execute the proposed activities and/or the changes in the behavior patterns.

Administrative agreement interfaces 112 may enable the administrators to initiate transmission of the activity proposals to client computing platforms 104 associated with the users of the user groups. The activity proposals may correspond to the proposed activities and the activity incentives specified by the administrators. The transmissions of the activity proposals may be initiated by selection of a particular one of the user interface elements (e.g., a virtual button). The activity proposals may be transmitted to respectively client computing platforms 104 via network 113.

By way of non-limiting illustration, a given activity proposal may propose the given set of activities to the users of the given user group and a given activity incentive.

In some implementations, administrative agreement interface 112 may enable selection and/or entry of one or more of the behavior patterns for user behavior monitoring component 128 to determine particular ones of the users that perform those one or more behavior patterns. For example, particular ones of the user interface elements may facilitate the selection or entry of the behavior patterns. By way of non-limiting illustration, a first administrator may select a first behavior pattern.

User behavior monitoring component 128 may be configured to monitor the behavior patterns of the users of online gaming platforms 105 to determine the users that perform the behavior patterns (selected or entered) within online gaming platforms 105. The user behaviors may be monitored in an ongoing manner. The term "ongoing manner" as used herein may refer to continuing to perform an action (e.g., monitor) periodically (e.g., every 30 seconds, every minute, every hour, etc.) until receipt of an indication to terminate. For example, the indication to terminate may include powering off client computing platform 104, selection by individual users to opt-out of their behavior patterns being monitored, and/or other indications of termination. By way of non-limiting illustration, the given set of the users may be determined to perform the first behavior pattern.

In some implementations, effectuating the presentation of the activity proposal may be based on the one or more behavior patterns selected and the users determined to perform the one or more behavior patterns. By way of non-limiting illustration, the given set of the users may be presented the given activity proposal based on the determination that the given set of the users perform the first behavior pattern.

In some implementations, administrative agreement interface 112 may enable selection and/or entry of one or more of the bonus benefits for the users within the user groups, a bonus trigger that causes dispersion of the bonus benefits, a message, and/or other information. Particular ones of the user interface elements may facilitate such selection and/or entry (e.g., text boxes, dropdown menus, etc.). The bonus benefits may be added incentives for the user groups or particular users of the user groups to form the new group agreements or execute the proposed activities in accordance with the formation proposals and the activity proposals, respectively.

For example, in some implementations, the bonus benefit may be one or more of an additional contribution to the group account balances of the respective user groups, a virtual item dispersed to the users, virtual currency dispersed to the users, and/or other bonus benefits. The bonus triggers may include particular ones of the recorded transactions, a particular amount of the transactions, a particular amount of a particular transaction (e.g., 10 trades of digital assets), the group account balance reaching a predefined amount within a predefined amount of time, and/or other bonus triggers. In some implementations, the bonus trigger that causes the dispersion of the bonus benefits may be the same as the trigger events so that the bonus benefits are dispersed at the same time as the dispersion of the group account balances. In some implementations, the bonus benefits may be dispersed only once. That is, the bonus benefits may be dispersed at a first occurrence of a trigger event and not dispersed at every occurrence of the trigger event. In some implementations, the bonus trigger may be different than the trigger events. In some implementations, the bonus benefits may be dispersed to all of the users of the respective user groups. In some implementations, the bonus benefits may be dispersed individually to particular ones of the users of the user groups.

For example, a given trigger event that causes dispersion of a given group account balance associated with the given user group may be the given group account balance reaching $500. A given bonus trigger that causes dispersion of a given bonus benefit may be the given group account balance reaching $500 in 5 days or less. The given bonus benefit may be an additional $50 for each user of the given user group. Thus, in some implementations, the dispersion of the group account balances to the users to the respective user groups may include the bonus benefit. The message may provide information related to the bonus trigger. That is, the message may include the bonus trigger to describe the dispersion of the bonus benefit (e.g., "The given group account balance reached $500 in 4 days").

In some implementations, presentation effectuation component 110 may be configured to generate the formation proposals and the activity proposals based on the respective definitions and specifications entered by the administrators. That is, for example, the given formation proposal may be generated based on the given group agreement, the given formation incentive, and/or other information.

Presentation effectuation component 110 may be configured to effectuate presentation of the formation proposals and the activity proposals. The presentations may be effectuated via the online gaming platforms 105 to respective client computing platforms 104. By way of non-limiting illustration, the given formation proposal may be presented to client computing platforms 104 associated with the given set of the users and the given activity proposal may be presented to client computing platforms 104 associated the users of the given user group.

In some implementations, presentation effectuation component 110 may be configured to effectuate, via online gaming platforms 105, presentation of the message that provides the information related to the bonus trigger. In some implementations, the presentation of the message may be effectuated at the time of the dispersion.

Instruction initiation component 114 may be configured to receive indications of acceptance to form the new group agreements. The indications of acceptance may be received from client computing platforms 104 associated with the users that are the prospective participants. The indications of acceptance may be received from client computing platforms 104 via network 113. By way of non-limiting illustration, a given indication of acceptance may be received from client computing platform 104 associated with a user from the given set of users to form the given group agreement in accordance with the given formation proposal.

Instruction initiation component 114 may be configured to generate sets of instructions to form the new group agreements as smart contracts. The sets of instructions may be generated responsive to receipt of the indications of acceptance. In some implementations, the smart contracts may be added to blockchain 117 implemented by decentralized ledger server 122. For example, a blockchain, such as blockchain 117, is a type of ledger, as well as a type of decentralized database that records rights pertaining to digital assets, transactions, and/or other information.

By way of non-limiting illustration, a given set of instructions may be generated to form the given group agreement as a given smart contract. Instruction initiation component 114 may be configured to transfer the generated sets of instructions to decentralized ledger server 122 for recording on blockchain 117. By way of non-limiting illustration, the given set of instructions may be transferred to decentralized ledger server 122.

Instruction initiation component 114 may be configured to provide the formation incentives to the respective set of the users in accordance with the formation proposals. The formation incentives may be provided subsequent to generation of the sets of instructions. By way of non-limiting illustration, subsequent to generation of the given set of instructions, the given formation incentive may be provided to the given set of the users in accordance with the given formation proposal. For example, a given contribution of virtual currency may be added to a group account balance associated with the given group agreement newly formed.

Activity execution component 120 may be configured to receive information indicating execution of the activities. The information may be received from online gaming platforms 105. By way of non-limiting illustration, particular information may be received from online gaming platform 105 that indicates execution of the given set of the activities by the users of the given user group.

Activity execution component 120 may be configured to provide, responsive to the receipts of the information indicating the executions, the activity incentives to the users of the respective user groups in accordance with the activity proposals. By way of non-limiting illustration, the given activity incentive may be provided to the users of the given user group in accordance with the given activity proposal responsive to the receipt of the particular information.

Instructions component 124 of decentralized ledger server 122 may be configured to receive the sets of instructions. Subsequently, instructions component 124 may be configured to execute the sets of instructions to record the new group agreements on blockchain 117 as the smart contracts. By way of non-limiting illustration, the given set of instructions may be received and executed to record the given smart contract on blockchain 117. In some implementations, once a smart contract has been added to a blockchain, the smart contract may be referred to as published, posted, registered, and/or recorded.

Elements of blockchain 117 may be grouped together in units that are referred to as blocks. For example, an individual block may include one or more assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets, one or more transactions, and/or other information.

In some implementations, blockchain 117 may be publicly accessible and append-only. In some implementations, existing blocks of blockchain 117 can substantially not be altered or deleted, unless multiple copies are altered. This is unlikely to happen provided that the multiple copies stored on different computing platforms, e.g., in different geographical locations. Blockchain 117 may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Figure 3B:
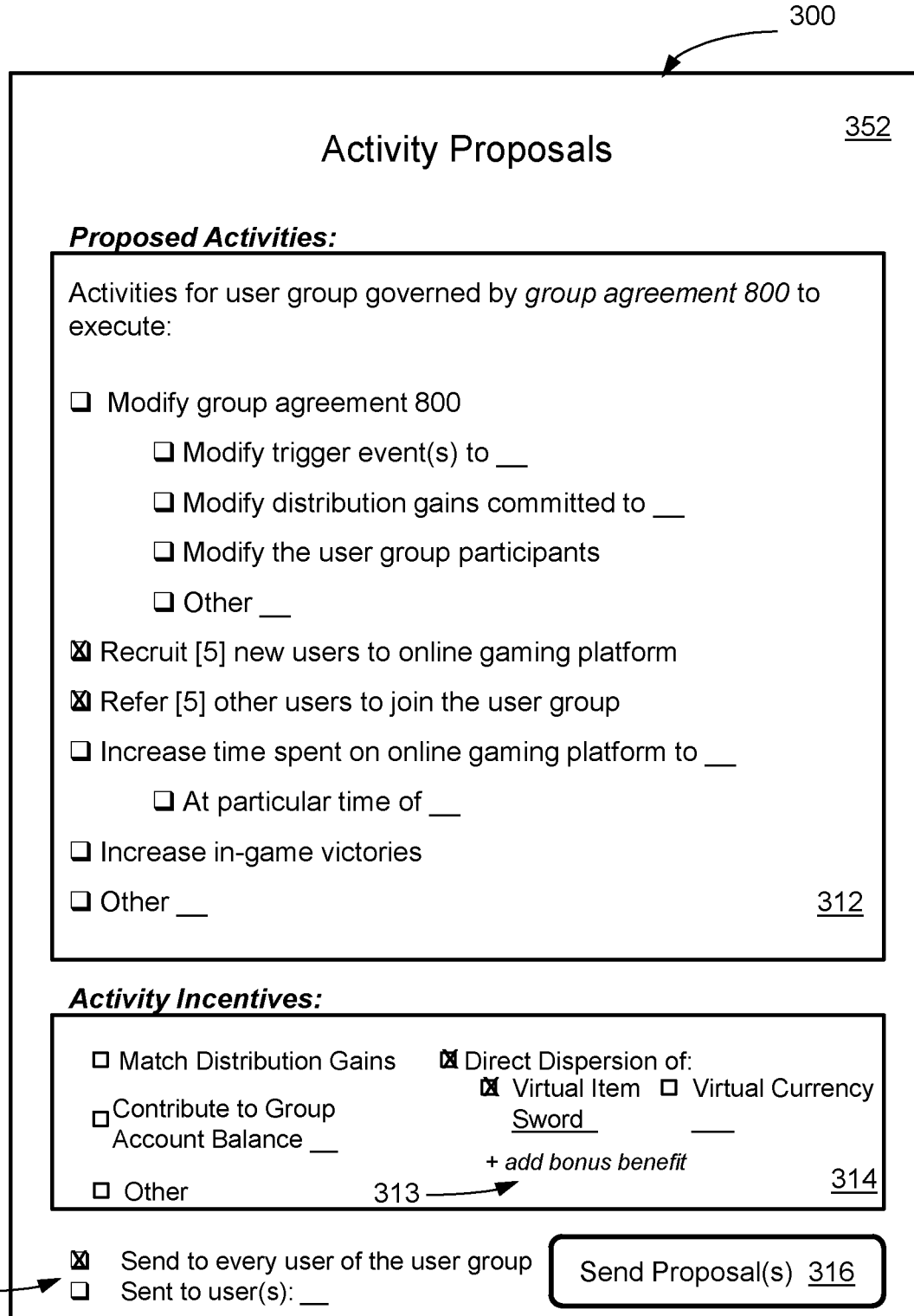

FIG. 3A-B illustrates an example implementation of an agreement interface as may be used by system 100, in accordance with one or more implementations. FIG. 3A may illustrate an administrative agreement interface 300. Administrative agreement interface 300 may enable users to interact with formation proposal interface 350 to create formation proposals. Formation proposal interface 350 may include agreement section 302 and incentive section 304. Agreement section 302 may enable an administrator to define a new group agreement. Defining the new group agreement via agreement section 302 may be facilitated by user interface elements that enable the administrator to specify distribution gains committed (e.g., all distribution gains), trigger events (e.g., $500 amount reached in group account balance), dispersion (e.g., equally divide the group account balance amongst users participating), and prospective participants for the new group agreement (e.g., user 10, 17, 25, and 6). Incentive section 304 may enable the administrator to select formation incentive(s) that may be provided to the prospective participants upon formation of the new group agreement (e.g., contribute $100 to the group account balance). The user interface elements may include a custom/other option that may enable the administrator to define an option not presented. Formation proposal interface 350 may include a virtual button 306 that initiates transmission of the formation proposals to the prospective participants specified in agreement section 302.

FIG. 3B may illustrate an administrative agreement interface 300 that same as FIG. 3B. Administrative agreement interface 300 (the same as FIG. 3A) may enables users to interact with activity proposal interface 352 to create activity proposals. Activity proposal interface 352 may include activities section 312 and incentive section 314. Activities section 312 may enable an administrator to specify proposed activities for users of a user group (e.g., governed by group agreement 800) to execute. Specifying the proposed activities via activities section 312 may be facilitated by user interface elements (e.g., recruit 5 new users and refer 5 users to join the user group checkboxes). Incentive section 314 may include user interface elements that enable the administrator to select activity incentive(s) to be provided to the user group upon execution of the proposed activities specified in activities section 312 (e.g., direct dispersion of virtual item). Incentive section 314 may include an option 313 to add a bonus benefit and bonus trigger for the bonus benefit. The user interface elements may include a custom/other option that may enable the administrator to define an option not presented. Activity proposal interface 352 may include a virtual button 316 that initiates transmission of the activity proposals to the user(s) of the user group in accordance with a recipient section 318. Recipient section 318 may include user interface elements to enable the administrator to select to send the activity proposal to all the users in the user group or particular users of the user group.

Figure 3C:
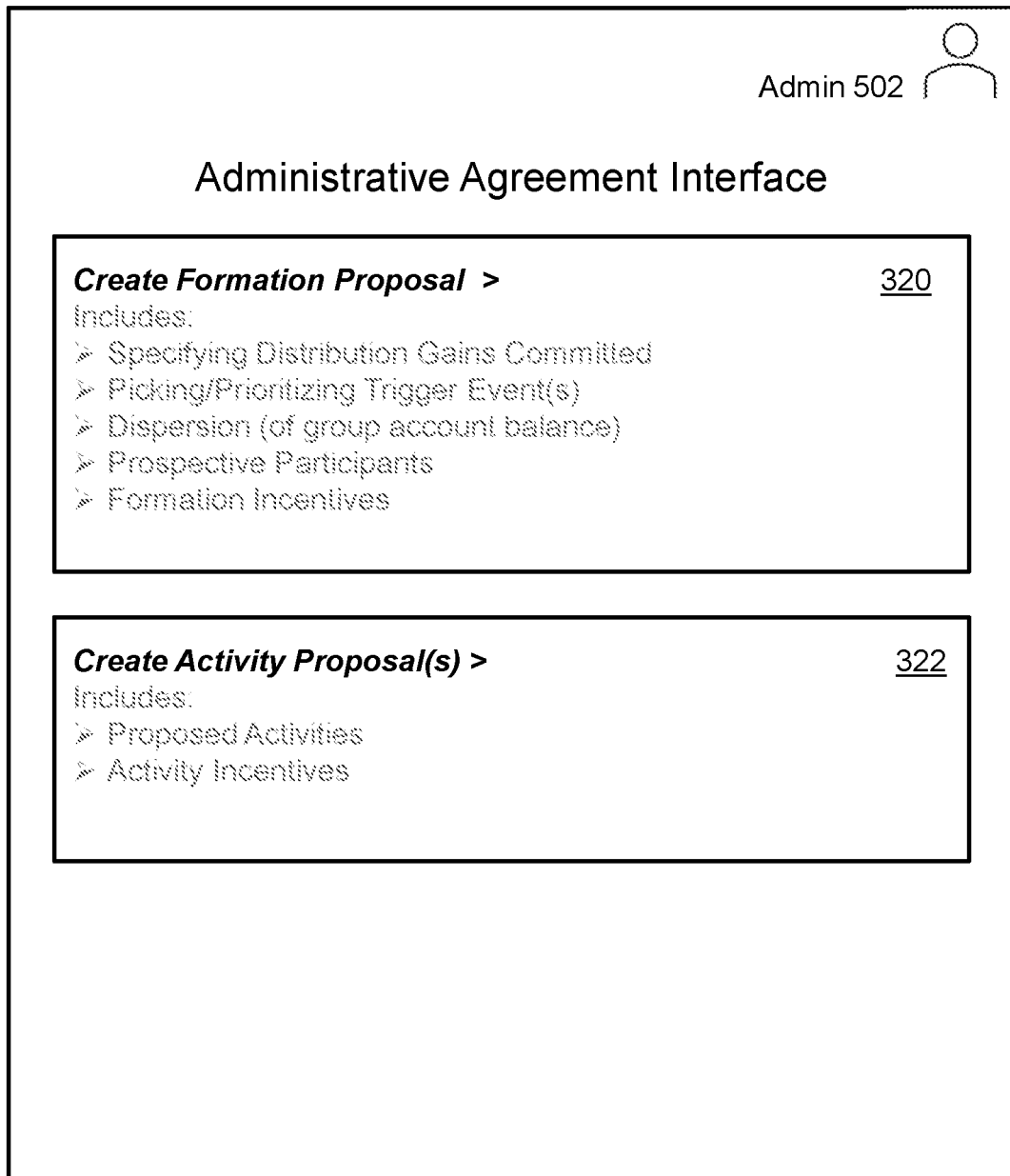

FIG. 3C illustrates administrative agreement interface 300 the same as in FIG. 3A-B that enables an administrator 502 to select formation option 320 and activity option 322. Selection of formation option 320 may open formation proposal interface 350 of FIG. 3A. Selection of activity option 322 may open activity proposal interface 352 of FIG. 3B.

Figure 4A:
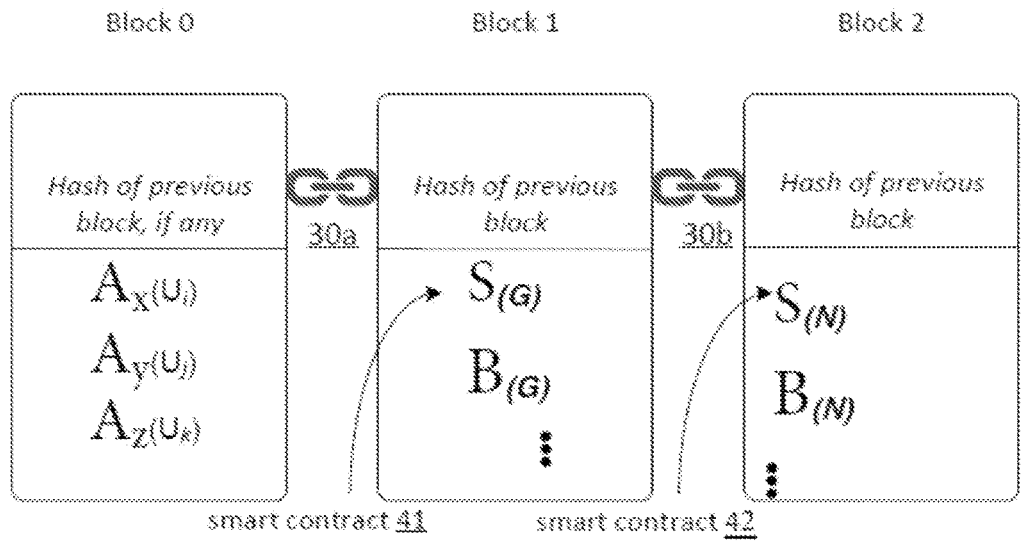
FIGS. 4A-4B illustrate a blockchain as may be used by a system configured to enable administrators as described herein, in accordance with one or more implementations.
Figure 4B:
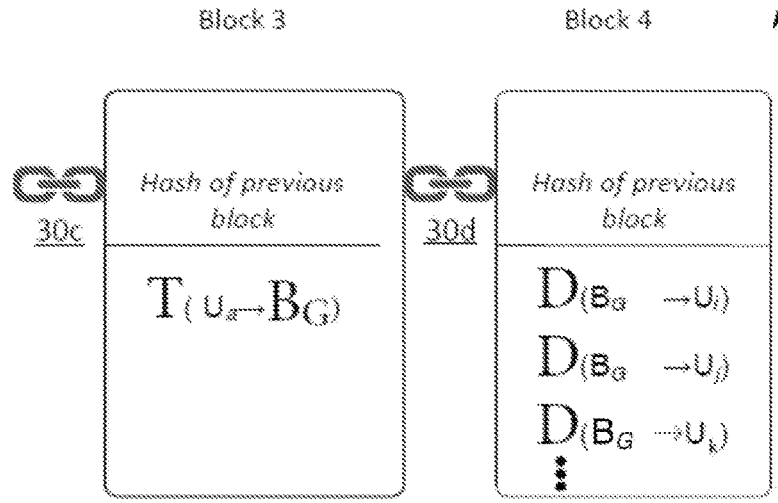

FIGS. 4A-4B illustrate exemplary blockchains as may be used by a system configured for operating a bridge server to support multiple shards of blockchains, in accordance with one or more implementations. FIG. 4A illustrates a blockchain 117*a* that includes a block 0, a block 1, and a block 2. As time progresses, more blocks may be added to blockchain 117*a*. The blocks within blockchain 117*a* are ordered. In block 0, three assets (indicated by a capital "A") are generated and/or assigned to three users or participants: a first digital asset, $A_x$, is assigned to user i ($U_i$), a second digital asset, $A_y$, is assigned to user j ($U_j$), and a third digital asset, $A_z$, is assigned to user k ($U_k$).

For example, the assets in block 0 may be individual distribution rights recorded for particular digital assets within an online gaming platform. Block 1 is connected to block 0 (as indicated by a link 30*a*), for example by including an address of block 1 in block 0, or vice versa. Likewise, block 1 is connected to block 2, as indicated by a link 30*b*.

In block 1, a smart contract 41 (indicated by a capital "S") is recorded and/or posted. For example, smart contract 41 may have been generated by a component similar to instructions component 124, and may have been posted to blockchain 117*a* by a component similar to instructions component 124 (shown in FIG. 1). Smart contract 41 may define a group agreement G. In some implementations, smart contract 41 may be recorded on a distributed blockchain as soon as all participants are known and/or have accepted. In some implementations, smart contract 41 may be recorded on a distributed blockchain subsequent to all participants being known and have accepted, and the particular details regarding the distribution gains, the dispersion, and trigger events being defined and agreed upon. Group agreements posted may be associated with an individual group account balance (indicated by a capital "B"). Group agreement G may be associated with a group account balance, $B_G$, in block 1 (illustrated as being separate from smart contract 41, though in some implementations, group balance $B_G$ may be embedded within and/or otherwise part of smart contract 41).

In block 2, a smart contract 42 (indicated by a capital "S") is posted. For example, smart contract 42 may have been generated by a component similar to instructions component 124, and may have been recorded on blockchain 117*a* by a component similar to instructions component 124 (shown in FIG. 1). Smart contract 42 may define a new group agreement N. New group agreement N may be associated with a group account balance, $B_N$, in block 2 (illustrated as being separate from smart contract 42, though in some implementations, group balance $B_N$ may be embedded within and/or otherwise part of smart contract 42).

FIG. 4B illustrates a blockchain 117*b* that includes the same blocks as blockchain 117*a* of FIG. 4A, plus additional blocks (block 3, block 4) that have been appended to the blockchain. Block 3 may be connected to block 2 (as indicated by a link 30*c*), and block 4 may be connected to block 3 (as indicated by a link 30*d*).

Block 3 includes a transaction (indicated by a capital "T"): a first transaction. The first transaction may be a contribution from an administrator a to group account balance $B_G$ responsive to a user group governed by $S_G$ executing proposed activities included in an activity proposal transmitted to the user group, presented to the user group, and accepted by the user group. For example, the activity proposal may have been specified and transmitted to the user group by administrator a.

In block 4, upon occurrence of at least one trigger event as defined by $S_G$, at least a portion of group account balance $B_G$ may be dispersed (indicated by a capital "D"). For example, group account balance $B_G$ may be evenly divided and dispersed amongst user i, user j, and user k who are included in the user group. In some implementations, dispersements and/or disbursements may be implemented as transactions recorded on blockchain 117*b*, e.g., depicted as $T(B_G \rightarrow U_i)$, and so forth. In some implementations, dispersements and/or disbursements may be implemented by autonomous transfers that are initiated by smart contract 41 (e.g., in case group balance $B_N$ is held by smart contract 41). For example, such transfers may be triggered when user behavior monitoring component 128 monitors particular activities that have been incentivized by a group agreement, and instructions component 124 receives one or more instructions that invoke one or more functions of smart contract 41 (through blockchain addresses that correspond to the functions of smart contract 41 that effectuate the autonomous transfers). As used herein, a transfer may be autonomous if initiated without manual intervention from a user or administrator, but automatically as defined by a smart contract.

Referring to FIG. 1, in some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 107, 108, 110, 114, 120, 124 and/or 128, and/or other components. Processor(s) 136 may be configured to execute components 107, 108, 110, 114, 120, 124 and/or 128, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 107, 108, 110, 114, 120, 124 and/or 128 are illustrated in FIG. 1 as being implemented within a single processing unit, in implementations in which processor(s) 136 includes multiple processing units, one or more of components 107, 108, 110, 114, 120, 124 and/or 128 may be implemented remotely from the other components. The description of the functionality provided by the different components 107, 108, 110, 114, 120, 124 and/or 128 described below is for illustrative purposes, and is not intended to be limiting, as any of components 107, 108, 110, 114, 120, 124 and/or 128 may provide more or less functionality than is described. For example, one or more of components 107, 108, 110, 114, 120, 124 and/or 128 may be eliminated, and some or all of its functionality may be provided by other ones of components 107, 108, 110, 114, 120, 124 and/or 128. As another example, processor(s) 136 may be configured to execute one or more additional components that may perform some or all of the functionality attributed below to one of components 107, 108, 110, 114, 120, 124 and/or 128.

Figure 2:
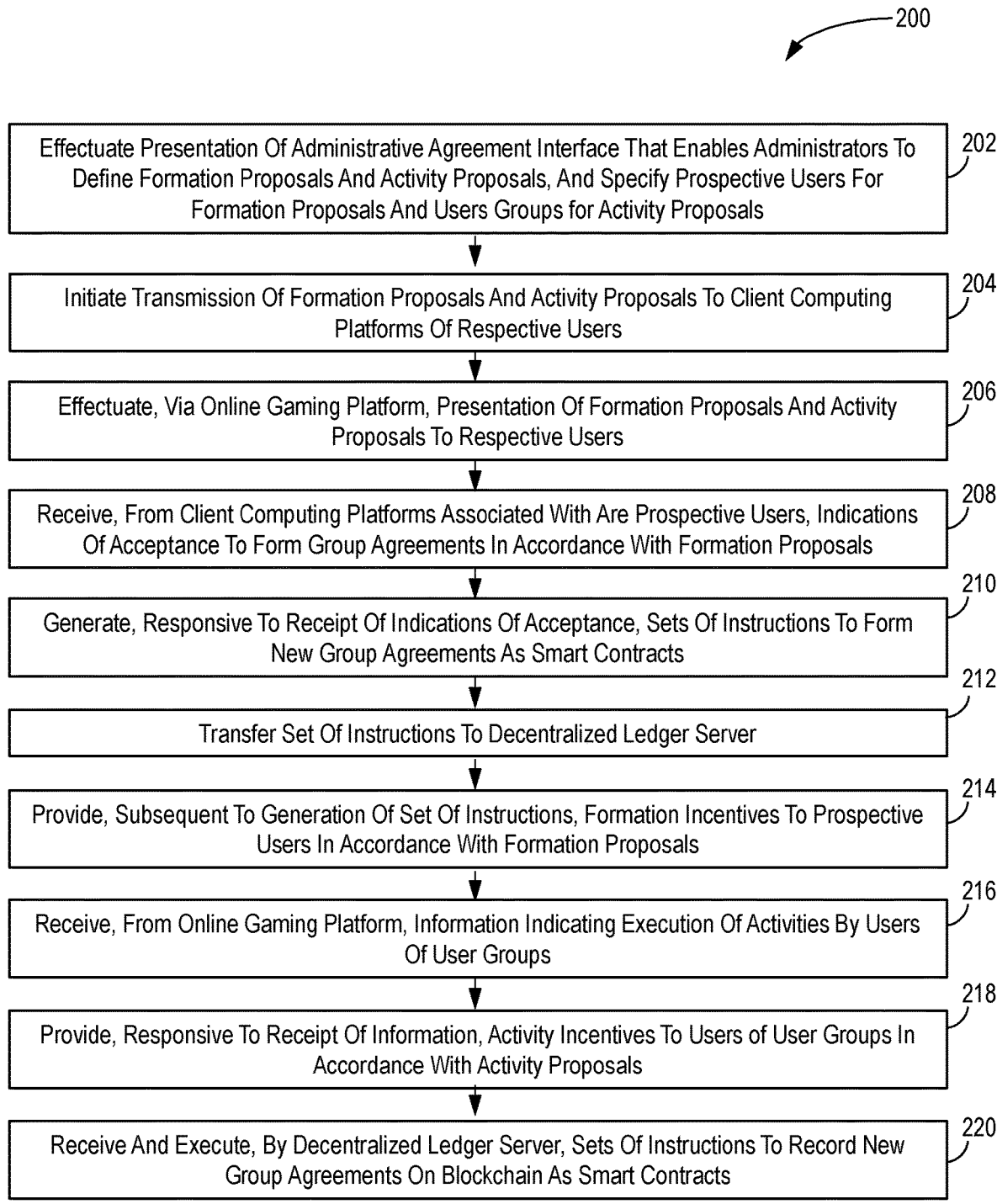
FIG. 2 illustrates a method to enable administrators to incentivize one or both of particular in-game user behaviors and particular in-game user activities via group agreements that govern user groups within an online game, in accordance with one or more implementations.

FIG. 2 illustrates a method 200 to enable administrators to incentivize one or both of particular in-game user behaviors and particular in-game user activities via group agreements that govern user groups within an online game, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include effectuating presentation of an administrative agreement interface that enables administrators to define formation proposals, define activity proposals, specify (prospective) users for the formation proposals, and specify user groups for the activity proposals (as previously described in FIG. 1). The prospective users may be users that are prospective participants of new group agreements defined by the administrators via the administrative agreement interface. The formation proposals may define a new group agreement and include formation incentives. The activity proposals may define proposed activities and include activity incentives. Operation 202 may be performed by one or more hardware processors configured by machine-readable instructions including a component that is the same as or similar to administrative interface component 108, in accordance with one or more implementations.

An operation 204 may include initiating transmission of formation proposals and activity proposals to client computing platforms of respective users. That is, transmission of the formation proposals to client computing platforms associated with the prospective users is initiated and transmission of the activity proposals to client computing platforms of the users of the user groups is initiated. Operation 204 may be performed by one or more hardware processors configured by machine-readable instructions including a component that is the same as or similar to administrative interface component 108, in accordance with one or more implementations.

An operation 206 may include effectuating, via an online gaming platform, presentation of the formation proposals and the activity proposals to the respective users. Operation 206 may be performed by one or more hardware processors configured by machine-readable instructions including a component that is the same as or similar to presentation effectuation component 110, in accordance with one or more implementations.

An operation 208 may include receiving, from client computing platforms associated with the users that are prospective participants, indications of acceptance to form the group agreements in accordance with the formation proposals. Operation 208 may be performed by one or more hardware processors configured by machine-readable instructions including a component that is the same as or similar to instruction initiation component 114, in accordance with one or more implementations.

An operation 210 may include generating, responsive to receipt of the indications of acceptance, sets of instructions to form the new group agreements as smart contracts. Operation 210 may be performed by one or more hardware processors configured by machine-readable instructions including a component that is the same as or similar to instruction initiation component 114, in accordance with one or more implementations.

An operation 212 may include transferring the set of instructions to a decentralized ledger server. Operation 212 may be performed by one or more hardware processors configured by machine-readable instructions including a component that is the same as or similar to instruction initiation component 114, in accordance with one or more implementations.

An operation 214 may include providing, subsequent to generation of the set of instructions, the formation incentives to the prospective users in accordance with the formation proposals. Operation 214 may be performed by one or more hardware processors configured by machine-readable instructions including a component that is the same as or similar to instruction initiation component 114, in accordance with one or more implementations.

An operation 216 may include receiving, from the online gaming platform, information indicating execution of the activities the users of the user groups. Operation 216 may be performed by one or more hardware processors configured by machine-readable instructions including a component that is the same as or similar to activity execution component 120, in accordance with one or more implementations.

An operation 218 may include providing, responsive to the receipt of the information, the activity incentives to the users of the user groups in accordance with the activity proposals. Operation 218 may be performed by one or more hardware processors configured by machine-readable instructions including a component that is the same as or similar to activity execution component 120, in accordance with one or more implementations.

An operation 220 may include receiving and executing, by the decentralized ledger server, the sets of instructions to record the new group agreements on a blockchain as the smart contracts. Operation 220 may be performed by one or more hardware processors configured by machine-readable instructions including a component that is the same as or similar to instructions component 124, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to enable administrators to incentivize particular in-game user activities via group agreements that govern user groups within an online game, wherein the group agreements commit disbursement of group account balances to the users within the user groups, the system comprising:
   one or more processors configured by machine-readable instructions to:
   effectuate presentation of an administrative agreement interface that enables administrators to:
   (a) define new group agreements to be formed,
   (b) define formation incentives responsive to formation of the new group agreements,
   (c) select users that are prospective participants for the new group agreements as defined,
   (d) select proposed activities for the user groups,
   (e) initiate transmission of formation proposals and activity proposals to client computing platforms associated with the users that are prospective participants, wherein the formation proposals correspond to the new group agreements, wherein the activity proposals correspond to the proposed activities, such that:
   (i) a given formation proposal proposes formation of a given group agreement between a given set of users that are prospective participants for the given group agreement, and a given formation incentive, and further such that:
   (ii) a given activity proposal proposes a given set of activities to users of a given user group;
   effectuate, via an online gaming platform, presentation of the formation proposals and the activity proposals such that the given formation proposal is presented to the given set of the users and the given activity proposal is presented to the users of the given user group;
   receive, from client computing platforms associated with the users that are prospective participants, indications of acceptance to form the new group agreements such that a given indication of acceptance is received from a client computing platform associated with a user from the given set of users to form the given group agreement in accordance with the given formation proposal;
   generate sets of instructions to form the new group agreements as smart contracts such that a given set of instructions is generated to form the given group agreement as a given smart contract;
   transfer the given set of instructions to a decentralized ledger server such that the given smart contract is recorded on a blockchain implemented by the decentralized ledger server;
   provide, subsequent to generation of the given set of instructions, the given formation incentive to the given set of the users in accordance with the given formation proposal;

receive, from the online gaming platform, particular information that indicates execution of the given set of the activities by the users of the given user group; and disperse, responsive to the receipt of the particular information, at least some of the group account balances to the users of the given user group in accordance with the given group agreement; and the decentralized ledger server comprising one or more processors configured by machine-readable instructions to:

receive and execute the sets of instructions to record the new group agreements on the blockchain as the smart contracts such that the given set of instructions is received and executed to record the given smart contract on the blockchain.

2. The system of claim 1, wherein the formation proposals and the activity proposals are transmitted separately.

3. The system of claim 2, wherein the one or more processors are further configured by machine-readable instructions to:

monitor, in an ongoing manner, in-game user activities of the users, wherein effectuating the presentation of the activity proposal is based on the in-game user activities of the users as monitored.

4. The system of claim 1, wherein the proposed activities for the user groups includes one or more of:
  (i) recruiting new users, and
  (ii) referring other users to join the user groups, wherein the proposed activities cause increasing:
    (a) time spent on the online gaming platform,
    (b) playing a game via the online gaming platform during a particular time of day, and/or
    (c) in-game victories frequency.

5. The system of claim 4, wherein the group agreements specify trigger events that cause the disbursement of some or all of the group account balances to the users within the respective user groups, wherein the modifying of the group agreements includes one or more of:
  (i) modifying the trigger events, and/or
  (ii) modifying the user groups.

6. The system of claim 1, wherein the formation incentive include one or more of:
  (i) contributions to the group account balances, and/or
  (ii) dispersing a direct bonus to the users within the respective user groups, wherein the direct bonus includes virtual items and/or virtual currency.

7. The system of claim 1, wherein the administrative agreement interface enables selection and/or entry of one or more of:
  (i) a bonus benefit for the users within the user groups,
  (ii) a bonus trigger that causes dispersion of the bonus benefit, and
  (iii) a message, so that the dispersion of the group account balances to the users within the respective user groups includes the bonus benefit, wherein the one or more processors are further configured by machine-readable instructions to:

effectuate, via the online gaming platform, presentation of the message that provides information related to the bonus trigger.

8. The system of claim 1, wherein proceeds from transactions pertaining to digital assets that the users of the user groups hold rights to are added to the group account balances.

9. The system of claim 1, wherein the given set of the activities are for execution by a particular user of the given user group.

10. The system of claim 1, wherein individual ones of the given set of the activities are for execution by particular users of the given user group.

11. A method configured to enable administrators to incentivize particular in-game user activities via group agreements that govern user groups within an online game, wherein the group agreements commit disbursement of the group account balances to the users within the user groups, the method comprising:

effectuating presentation of an administrative agreement interface that enables administrators to:
  (a) define new group agreements to be formed,
  (b) define formation incentives responsive to formation of the new group agreements,
  (c) select users that are prospective participants for the new group agreements as defined,
  (d) select proposed activities for the user groups,
  (e) initiate transmission of formation proposals and activity proposals to client computing platforms associated with the users that are prospective participants, wherein the formation proposals correspond to the new group agreements, wherein the activity proposals correspond to the proposed activities, such that:
    (i) a given formation proposal proposes formation of a given group agreement between a given set of users that are prospective participants for the given group agreement, and a given formation incentive, and further such that:
    (ii) a given activity proposal proposes a given set of activities to users of a given user group;

effectuating, via an online gaming platform, presentation of the formation proposals and the activity proposals such that the given formation proposal is presented to the given set of the users and the given activity proposal is presented to the users of the given user group;

receiving, from client computing platforms associated with the users that are prospective participants, indications of acceptance to form the new group agreements such that a given indication of acceptance is received from a client computing platform associated with a user from the given set of users to form the given group agreement in accordance with the given formation proposal;

generating sets of instructions to form the new group agreements as smart contracts such that a given set of instructions is generated to form the given group agreement as a given smart contract;

transferring the given set of instructions to a decentralized ledger server such that the given smart contract is recorded on a blockchain implemented by the decentralized ledger server;

providing, subsequent to generation of the given set of instructions, the given formation incentive to the given set of the users in accordance with the given formation proposal;

receiving, from the online gaming platform, particular information that indicates execution of the given set of the activities by the users of the given user group; and dispersing, responsive to the receipt of the particular information, at least some of the group account balances to the users of the given user group in accordance with the given group agreement; and receiving and executing the sets of instructions to record the new group agreements on the blockchain as the smart contracts such that the given set of instructions is received and executed to record the given smart contract on the blockchain.

12. The method of claim 11, wherein the formation proposals and the activity proposals are transmitted separately.

13. The method of claim 12, further comprising:
monitoring, in an ongoing manner, in-game user activities of the users,
wherein effectuating the presentation of the activity proposal is based on the in-game user activities of the users as monitored.

14. The method of claim 11, wherein the proposed activities for the user groups includes one or more of:
(i) recruiting new users, and
(ii) referring other users to join the user groups, wherein the proposed activities cause increasing:
(a) time spent on the online gaming platform,
(b) playing a game via the online gaming platform during a particular time of day, and/or
(c) in-game victories frequency.

15. The method of claim 14, wherein the group agreements specify trigger events that cause the disbursement of some or all of the group account balances to the users within the respective user groups, wherein the modifying of the group agreements includes one or more of:
(i) modifying the trigger events, and/or
(ii) modifying the user groups.

16. The method of claim 11, wherein the formation incentive include one or more of:
(i) contributions to the group account balances, and/or
(ii) dispersing a direct bonus to the users within the respective user groups, wherein the direct bonus includes virtual items and/or virtual currency.

17. The method of claim 11, wherein the administrative agreement interface enables selection and/or entry of one or more of:
(i) a bonus benefit for the users within the user groups,
(ii) a bonus trigger that causes dispersion of the bonus benefit, and
(iii) a message, so that the dispersion of the group account balances to the users within the respective user groups includes the bonus benefit, further comprising:
effectuating, via the online gaming platform, presentation of the message that provides information related to the bonus trigger.

18. The method of claim 11, wherein proceeds from transactions pertaining to digital assets that the users of the user groups hold rights to are added to the group account balances.

19. The method of claim 11, wherein the given set of the activities are for execution by a particular user of the given user group.

20. The method of claim 1, wherein individual ones of the given set of the activities are for execution by particular users of the given user group.

* * * * *